UNITED STATES PATENT OFFICE.

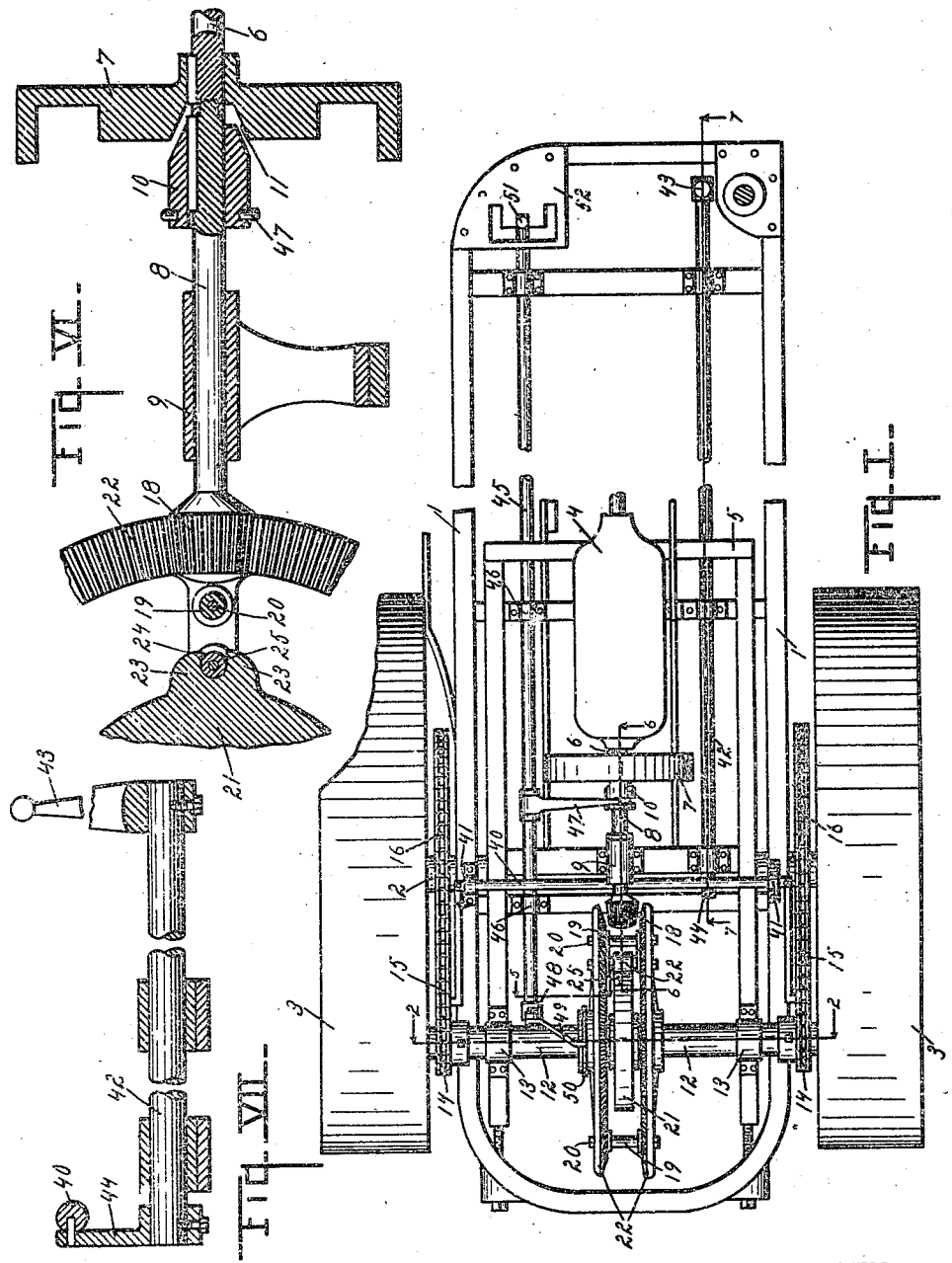

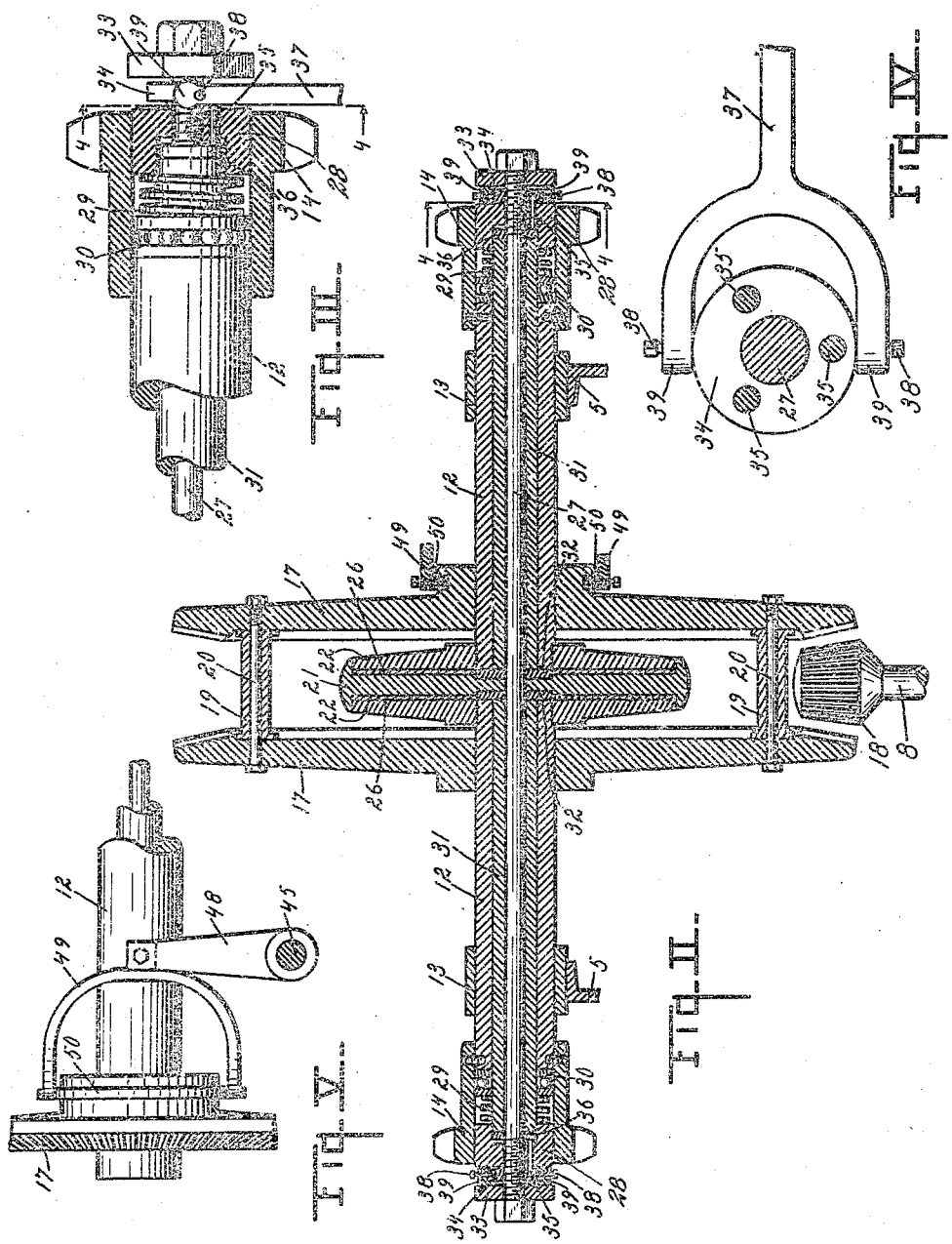

FRANK BURTT, OF KALAMAZOO, MICHIGAN, ASSIGNOR, BY DIRECT AND MESNE ASSIGNMENTS, TO ALBAUGH-DOVER CO., OF CHICAGO, ILLINOIS.

DRIVING OR TRANSMISSION GEARING.

1,211,538.  Specification of Letters Patent.  Patented Jan. 9, 1917.

Original application filed May 1, 1914, Serial No. 835,585. Divided and this application filed October 5, 1915. Serial No. 54,151.

*To all whom it may concern:*

Be it known that I, FRANK BURTT, a citizen of the United States, residing at 939 Washington avenue, Kalamazoo, county of Kalamazoo, and State of Michigan, have invented certain new and useful Improvements in Driving or Transmission Gearing, of which the following is a specification.

This invention relates to improvements in driving or transmission gearing.

My improved driving or transmission gearing is especially designed by me for use on heavy motor trucks and the like and I have illustrated the same as embodied in tractor plows such as shown in my application for Letters Patent filed May 1, 1914, Serial No. 835,585, of which application this is a division. My improvements are, however, desirable for use and may be readily embodied in various other relations.

The main objects of this invention are: First, to provide an improved driving or transmission gearing. Second, to provide an improved driving or transmission gearing adapted as a differential and reverse gearing. Third, to provide an improved driving or transmission gearing having these advantages which is well adapted to withstand severe strains.

Further objects, and objects relating to details and economies of construction and operation will definitely appear from the detailed description to follow.

I accomplish the objects of my invention by the devices and means described in the following specification.

The invention is clearly defined and pointed out in the claims.

A structure constituting a preferred embodiment of my invention is illustrated in the accompanying drawing forming a part of this specification, in which:

Figure I is a detail plan view of a tractor structure embodying the features of my invention. Fig. II is an enlarged detail section through the transmission or driving gearing on a line corresponding to line 2—2 of Fig. I. Fig. III is a detail plan of the transmission gearing partially in longitudinal section. Fig. IV is an enlarged detail section on a line corresponding to line 4—4 of Figs. II and III. Fig. V is a detail transverse section on a line corresponding to line 5—5 of Fig. I showing details of the transmission control mechanism. Fig. VI is an enlarged detail section on a line corresponding to line 6—6 of Fig. I showing details of the driving connection. Fig. VII is a detail vertical section on a line corresponding to line 7—7 of Fig. I, showing further details of the control mechanism.

In the drawing similar reference characters refer to similar parts throughout the several views, and the sectional views are taken looking in the direction of the little arrows at the ends of the section lines.

Referring to the drawing, the main or running gear frame 1 of the tractor illustrated is formed of longitudinal sills or members and cross pieces to provide a rigid frame or support for the parts mounted thereon. The axle 2 is disposed in suitable bearings, not shown, on the under side of the frame. The traction wheels 3 are shown conventionally. The engine 4, which is also shown conventionally, is mounted on the frame 5. The details of the engine brackets and of the engine carrying frame are not shown and described herein as they form no part of the present invention.

6 represents the crank shaft of the engine and is provided with a fly wheel 7. The driving shaft 8 is supported in a suitable bearing 9 and is connected to the crank shaft by the clutch consisting of a member 10 splined to the driving shaft 8, the fly wheel 7 being provided with a coacting clutch member 11. A pair of tubular driven shafts 12 are disposed in alinement in the bearings 13. The driven shafts 12 are provided with sprockets 14 connected by the sprocket chains 15 to sprocket wheels 16 on the traction wheels, thus providing independent driving connections for the driving shafts to the traction wheels. A pair of driven beveled gears 17 are mounted on the driven shafts 12 for rotative and axial movement thereon, the axial movement being provided so that either of the gears may be shifted into mesh with the driving gear 18 on the driving shaft 8 or to a neutral position. The gears are shown in neutral position in the drawings. These gears are secured to move as one by means of the spools 19 and the bolts 20 therethrough, see Fig. II. Between these gears 17 is a driving friction disk 21 and a pair of driven friction disks 22 arranged one at each side of the driving friction disk. The driven friction disks are secured to the driven shafts 12. The driving friction disk is secured to the gears 17 by means of the driving lugs 23 radially slotted at 24 to engage the cross members 25 on the gears 17, see Fig. VI, which connection permits the axial shifting of the gears 17. The driven disks 22 are provided with friction facings 26. A rod 27 is arranged through the driven shaft to project from the ends thereof. On this rod are thrust members 28 for the outer ends of the springs 29, which act on the driven shafts 12 to hold the friction driving members in engagement. Ball thrust bearings, designated generally by the numeral 30, are disposed between the ends of the driven shafts and these springs 29. The thrust members 28 are adjustable on the rod 27 to regulate the tension of the springs 29 and thus the frictional pressure on the friction members.

Sleeved upon the rod 27 within the shafts 12 are sleeves 31, the inner ends of which engage washers 32 on the sides of the driving friction disk 21. Mounted upon the ends of the rod 27 between support members 33 and the thrust members 28 are collars 34 having pins 35 thereon disposed through the thrust members 28 to engage the ends of the sleeves 31, washers 36 being provided between the inner ends of these pins and the sleeves. The levers 37 are mounted on these collars by the pivots 38 and are provided with cams 39 which engage the supports 33 on the rod 27 as the levers are swung on their pivots forcing the collars 34 inwardly when the lever is swung inwardly thereby pulling outwardly on the rod. This decreases the tension of one of the springs 29 and increases that of the other so that one driven friction disk is permitted to slip and the friction on the other against the driving disk is increased. The levers are connected by the shifting bar 40 supported in the bearings 41 on the frame 1 for longitudinal movement. This shifting bar is controlled by the shaft 42 having the hand lever 43 which is connected to the shifting bar by the arm 44. See Figs. I and VII.

The clutch member 10 of the shaft 8 is controlled from the control shaft 45 supported in the bearings 46 for rotative and longitudinal movement. The control shaft 45 is provided with an arm 47 engaging the clutch member 10 and with an arm 48 connected by the link 49 with the collar 50 engaging the hub of one of the gears 17 (see Figs. I and IV). The control shaft 45 is provided with a lever 51 disposed through the keeper plate 52. The keeper plate is designed so that the control shaft 45 must be moved longitudinally before it can be rocked to shift the gears. This longitudinal movement disengages the clutch 10. With the parts thus arranged the driven shafts 12 are driven through the frictional engagement of the driven disks 26 with the driving disk 21 and, as stated, the structure is designed so that the friction of either disk 26 may be increased or diminished thus disconnecting one driven disk or permitting it to slip as occasion may require. The operation of the parts accomplishing this is as follows: When the right hand lever 37 is shifted to the right or outward from its neutral position, see Fig. III, in which position the friction between the driven and the driving disks is substantially the same, the cams 39 act on the right hand thrust member 28 to increase the tension on the spring 29 at that end. As the two levers 37 are connected by the shifting bar this movement shifts the left hand fulcrum on lever 37 inwardly, the pins 35 which are supported by the sleeve 31 thereby pulling on the rod 27 allowing the thrust member 28 at that end to retract, and the pressure on the left side friction disk 26 is decreased or removed. When it reverses or shifts in the opposite direction this action is reversed. By this arrangement of parts, the transmission is readily adjusted to drive both traction wheels or only one or the driving friction may be varied as desired so that one wheel is in effect a pivot around which the tractor swings in turning. This is a very great advantage as it permits turning in a small compass and strain on the driving connection is at a minimum.

I have illustrated and described my improvements in a simple and practical embodiment. I have not attempted to illustrate or describe various modifications or structural details which I contemplate as I believe the disclosure made will enable those skilled in the art to which my invention relates to embody or adapt the same as conditions may require. I desire, however, to be understood as claiming my improvements specifically in the form illustrated as well as broadly within the scope of the appended claims.

Having thus described my invention, what I claim as new and desire to secure by Letters Patent is:

1. In a structure of the class described, the combination of a running gear frame, a pair of traction wheels, a pair of alined tubular driven shafts, independent driving connections for said shafts and traction wheels, a beveled driving gear, a pair of facing beveled driven gears mounted on said driven shafts for rotative and axial movement whereby either may be shifted into mesh with said driving gear, a pair of driven friction disks disposed between said driven gears and secured to said driven shafts, a driving friction disk disposed between and coacting with said driven friction disks, said driving friction disk having driving connection with said driven gears, a rod arranged through said driven shafts for longitudinal movement, springs arranged to act on said driven shafts, thrust members for the outer ends of said springs carried by said rod, collars mounted on said rod on the outer sides of said thrust members, sleeves arranged on said rod within said driven members with their inner ends engaging said driving friction member, pins carried by said collars arranged through said thrust members to act on said sleeves, support members on the outer ends of said rod, cam levers pivotally mounted on said collars to engage said support members, and a shifting bar connecting said cam levers, all coacting for the purpose specified.

2. In a structure of the class described, the combination of a running gear frame, a pair of traction wheels, a pair of alined tubular driven shafts, independent driving connections for said shafts and traction wheels, a beveled driving gear, a pair of facing beveled driven gears mounted on said driven shafts for rotative and axial movement whereby either may be shifted into mesh with said driving gear, a pair of driven friction disks disposed between said driven gears and secured to said driven shafts, a driving friction disk disposed between and coacting with said driven friction disks, said driving friction disk having driving connection with said driven gears, a rod arranged through said driven shafts for longitudinal movement therein, springs arranged to act on said driven shafts, thrust members for the outer ends of said springs carried by said rod, sleeves arranged on said rod within said driven shafts for longitudinal movement therein to act on said driving friction member, and means for simultaneously shifting said rod and sleeves.

3. In a structure of the class described, the combination of a running gear frame, a pair of traction wheels, a pair of alined tubular driven shafts, independent driving connections for said shafts and traction wheels, a beveled driving gear, a pair of facing beveled driven gears mounted on said driven shafts for rotative and axial movement whereby either may be shifted into mesh with said driving gear, a pair of driven friction disks disposed between said driven gears and secured to said driven shafts, a driving friction disk disposed between and coacting with said driven friction disks, said driving friction disk having driving connection with said driven gears, a rod arranged through said driven shafts for longitudinal movement therein, coiled springs arranged to act on said driven shafts, thrust members for the outer ends of said springs carried by said rod, and means for simultaneously increasing the tension on one of said springs and decreasing the tension on the other, for the purpose specified.

4. In a structure of the class described, the combination of a running gear frame, a pair of traction wheels, a pair of alined tubular driven shafts, independent driving connections for said shafts and traction wheels, a pair of driven friction disks secured to said driven shafts, a driving friction disk disposed between and coacting with said driven friction disks, a rod arranged through said driven shafts for longitudinal movement therein, coiled springs arranged to act on the outer ends of said driven shafts, thrust members for the outer ends of said springs carried by said rod, sleeves arranged on said rod within said driven shafts for longitudinal movement therein to engage said driving friction member, collars mounted on said rod on said thrust members, pins carried by said collars arranged through said thrust members to act on said sleeves, support members on the outer ends of said rod, levers pivotally mounted on said collars to engage said support members, and a shifting bar connecting said levers, all coacting for the purpose specified.

5. In a structure of the class described, the combination of a running gear frame, a pair of traction wheels, a pair of alined tubular driven shafts, independent driving connections for said shafts and traction wheels, a pair of driven friction disks secured to said driven shafts, a driving friction disk disposed between and coacting with said driven friction disks, a rod arranged through said driven shafts for longitudinal movement therein, coiled springs arranged to act on the outer ends of said driven shafts, thrust members for the outer ends of said springs carried by said rod, sleeves arranged on said rod within said driven shafts for longitudinal movement therein to engage said driving friction member, and means for simultaneously shifting said rod and sleeves, all coacting for the purpose specified.

6. In a structure of the class described, the combination of a running gear frame, a pair of traction wheels, a pair of driven friction members, independent driving connections for said driven friction members and traction wheels, a driving friction member disposed between and coacting with said driven friction members, a rod arranged axially through said friction members, coiled springs arranged to act on said driven friction members, thrust members for the outer ends of said springs carried by said rod, control members arranged on said rod for longitudinal movement to act on said driving friction member, collars mounted on said rod on the outer sides of said thrust members, pins carried by said collars arranged through said thrust members to act on said control members, support members on the outer ends of said rod, levers pivotally mounted on said collars to engage said support members, and a shifting bar connecting said levers, all coacting for the purpose specified.

7. In a structure of the class described, the combination of a running gear frame, a pair of traction wheels, a pair of driven friction members, independent driving connections for said driven friction members and traction wheels, a driving friction member disposed between and coacting with said driven friction members, a rod arranged axially through said friction members, coiled springs arranged to act on said driven friction members, thrust members for the outer ends of said springs carried by said rod, control members arranged on said rod for longitudinal movement to act on said driving friction member, and means for simultaneously actuating said rod and one of said control members in opposite directions, all coacting for the purpose specified.

8. The combination of a pair of alined tubular driven shafts, a beveled driving gear, a pair of facing beveled driven gears mounted on said driven shafts for rotative and axial movement whereby either may be shifted into mesh with said driving gear, a pair of driven friction disks disposed between said driven gears and secured to said driven shafts, a driving friction disk disposed between and coacting with said driven friction disks, said driving friction disk having driving connection with said driven gears, a rod arranged through said driven shafts for longitudinal movement therein, springs arranged to act on said driven shafts, thrust members for the outer ends of said driven shafts carried by said rod, arranged on said rod for longitudinal movement thereon to act on said driving friction member, collars mounted on said rod on the outer sides of said thrust members, pins carried by said collars arranged through said thrust members to act on said sleeves, support members on the outer ends of said rod, cam levers pivotally mounted on said collars to engage said support members, and a shifting bar connecting said cam levers, all coacting for the purpose specified.

9. The combination of a pair of alined tubular driven shafts, a beveled driving gear, a pair of facing beveled driven gears mounted on said driven shafts for rotative and axial movement whereby either may be shifted into mesh with said driving gear, a pair of driven friction disks disposed between said driven gears and secured to said driven shafts, a driving friction disk disposed between and coacting with said driven friction disks, said driving friction disk having driving connection with said driven gears, a rod arranged through said driven shafts for longitudinal movement therein, springs arranged to act on said driven shafts, thrust members for the outer ends of said springs carried by said rod, sleeves arranged on said rod within said driven shafts for longitudinal movement therein to act on said driving friction member, and means for simultaneously shifting said rod and sleeves.

10. The combination of a pair of alined tubular driven shafts, a beveled driving gear, a pair of facing beveled driven gears mounted on said driven shafts for rotative and axial movement whereby either may be shifted into mesh with said driving gear, a pair of driven friction disks disposed between said driven gears and secured to said driven shafts, a driving friction disk disposed between and coacting with said driven friction disks, said driving friction disk having driving connection with said driven gears, a rod arranged through said driven shafts for longitudinal movement therein, coiled springs arranged to act on said driven shafts, thrust members for the outer ends of said springs carried by said rod, and means for simultaneously increasing the tension on one of said springs and decreasing the tension on the other, for the purpose specified.

11. The combination of a pair of alined tubular driven shafts, a pair of driven friction disks secured to said driven shafts, a driving friction disk disposed between and coacting with said driven friction disks, a rod arranged through said driven shafts for longitudinal movement thereon, coiled springs arranged to act on the outer ends of said driven shafts, thrust members for the outer ends of said springs carried by said rod, sleeves arranged on said rod within said driven shafts for longitudinal movement therein to engage said driving friction member, collars mounted on said rod on said thrust members, pins carried by said collars arranged through said thrust members to act on said sleeves, support members on the outer ends of said rod, levers pivotally mounted on said collars to engage said support members, and a shifting bar connecting said levers, all coacting for the purpose specified.

12. The combination of a pair of alined tubular driven shafts, a pair of driven friction disks secured to said driven shafts, a driving friction disk disposed between and coacting with said driven friction disks, a rod arranged through said driven shafts for longitudinal movement therein, coiled springs arranged to act on the outer ends of said driven shafts, thrust members for the outer ends of said springs carried by said rod, sleeves arranged on said rod within said driven shafts for longitudinal movement therein to engage said driven friction member, and means for simultaneously shifting said rod and sleeves, all coacting for the purpose specified.

13. The combination of a pair of driven friction members, a driving friction member disposed between and coacting with said driven friction members, a rod arranged axially through said friction members, coiled springs arranged to act on said driven friction members, thrust members for the outer ends of said springs carried by said rod, control members arranged on said rod for longitudinal movement to act on said driving friction member, collars mounted on said rod on the outer sides of said thrust members, pins carried by said collars arranged through said thrust members to act on said control members, support members on the outer ends of said rod, levers pivotally mounted on said collars to engage said support members, and a shifting bar connecting said levers, all coacting for the purpose specified.

14. The combination of a pair of driven friction members, a driving friction member disposed between and coacting with said driven friction members, a rod arranged axially through said friction members, coiled springs arranged to act on said driven friction members, thrust members for the outer ends of said springs carried by said rod, control members arranged on said rod for longitudinal movement to act on said driving friction member, and means for simultaneously actuating said rod and one of said control members in opposite directions, all coacting for the purpose specified.

15. The combination of a pair of alined tubular driven shafts, a pair of driven friction disks secured to said driven shafts, a driving friction disk disposed between and coacting with said driven friction disks, a rod arranged through said driven shafts, coiled springs arranged to act on the outer ends of said driven shafts, thrust members for the outer ends of said springs carried by said rod, and sleeves arranged on said rod within said driven shafts for longitudinal movement therein to engage said driven friction member.

In witness whereof, I have hereunto set my hand and seal in the presence of two witnesses.

FRANK BURTT. [L. S.]

Witnesses:
LUELLA G. GREENFIELD,
MARGARET L. GLASGOW.

Copies of this patent may be obtained for five cents each, by addressing the "Commissioner of Patents, Washington, D. C."